US012625498B2

(12) United States Patent　　(10) Patent No.:　US 12,625,498 B2
Eriksen Nielsen et al.　　(45) Date of Patent:　May 12, 2026

(54) MANAGING A FLEET OF ROBOTS

(71) Applicant: MOBILE INDUSTRIAL ROBOTS A/S, Odense S (DK)

(72) Inventors: Søren Eriksen Nielsen, Sønderborg (DK); Morten Steen Nørby, Nyborg (DK)

(73) Assignee: MOBILE INDUSTRIAL ROBOTS A/S, Odense SOE (DK)

( * ) Notice: Subject to any disclaimer, the term of this patent is extended or adjusted under 35 U.S.C. 154(b) by 55 days.

(21) Appl. No.: 18/267,520

(22) PCT Filed: Nov. 4, 2021

(86) PCT No.: PCT/EP2021/080603
§ 371 (c)(1),
(2) Date: Jun. 15, 2023

(87) PCT Pub. No.: WO2022/128244
PCT Pub. Date: Jun. 23, 2022

(65) Prior Publication Data
US 2024/0053768 A1　　Feb. 15, 2024

(30) Foreign Application Priority Data

Dec. 16, 2020　(EP) ..................................... 20214616

(51) Int. Cl.
*G05D 1/00*　　(2006.01)
*G08C 17/02*　　(2006.01)
(52) U.S. Cl.
CPC ........... *G05D 1/0291* (2013.01); *G08C 17/02* (2013.01)
(58) Field of Classification Search
CPC ............................... G05D 1/0291; G08C 17/02
See application file for complete search history.

(56) References Cited

U.S. PATENT DOCUMENTS 9,668,146 B2　5/2017　Lau
9,958,864 B2　5/2018　Kentley-Klay et al.
(Continued)

FOREIGN PATENT DOCUMENTS

WO　　WO-2007065031 A2 *　6/2007　.............. A47L 11/24

OTHER PUBLICATIONS

English translation of WO-2007065031-A2 (Year: 2007).*
(Continued)

*Primary Examiner* — Navid Z. Mehdizadeh
*Assistant Examiner* — Matthew Ho
(74) *Attorney, Agent, or Firm* — ARENTFOX SCHIFF LLP

(57) ABSTRACT

Methods, systems, and non-transitory machine-readable media encoding instructions for managing a fleet of autonomous mobile robots in a facility. In one aspect, a computer-implemented system for managing a fleet of autonomous mobile robots in a facility can include a log of characteristics of cycle times of communications between the system and the autonomous mobile robots in the fleet over time, and an analysis component configured to determine, based on the logged characteristics of the cycle times, i) a location in a facility at which or ii) a time of day during which or iii) equipment used in communications between the system and the autonomous mobile robots in the plurality that are either inadequate or deficient. Each communications cycle includes wireless transmission of test signals to a plurality of the autonomous mobile robots in the fleet and receipt of responses to the test signals transmitted wirelessly from each of the autonomous mobile robots in the plurality.

21 Claims, 5 Drawing Sheets

(56) References Cited

U.S. PATENT DOCUMENTS

| 10,440,675 | B2 | 10/2019 | Socaciu et al. | |
| 10,554,527 | B2 | 2/2020 | Lopes | |
| 10,664,502 | B2 | 5/2020 | Chambers et al. | |
| 10,785,123 | B2 | 9/2020 | Gonguet | |
| 12,015,961 | B2 | 6/2024 | Kahn et al. | |
| 2012/0264439 | A1* | 10/2012 | Jorguseski | H04W 16/18 |
| | | | | 455/446 |
| 2013/0040649 | A1* | 2/2013 | Soto Matamala | H04W 64/00 |
| | | | | 455/456.1 |
| 2015/0230109 | A1 | 8/2015 | Socaciu et al. | |
| 2015/0312774 | A1* | 10/2015 | Lau | G05D 1/0274 |
| | | | | 455/446 |
| 2018/0176111 | A1 | 6/2018 | Lopes | |
| 2018/0321687 | A1 | 11/2018 | Chambers et al. | |
| 2018/0356821 | A1 | 12/2018 | Kentley-Klay et al. | |
| 2020/0162336 | A1* | 5/2020 | Gonguet | H04L 41/0893 |
| 2021/0385721 | A1* | 12/2021 | Kahn | H04W 4/024 |

OTHER PUBLICATIONS

Communication pursuant to Article 94(3) EPC in Application No. 20214616.3 dated Apr. 24, 2024, 4 pages.

Communication pursuant to Article 94(3) EPC in Application No. 20214616.3 dated Nov. 15, 2023, 5 pages.
International Search Report and Written Opinion in Application No. PCT/EP2021/080603 dated Jul. 2, 2022, 11 pages.
International Preliminary Report on Patentability in Application No. PCT/EP2021/080603 dated Jun. 13, 2023, 8 pages.
Communication pursuant to Article 94(3) EPC in Application No. 20214616.3 dated Jun. 29, 2023, 4 pages.
"MIR 500 User Guide," Mobile Industrial Robots A/S, Odense, SØ, Ver. 1.3, (Sep. 2019), 100 pages.
"MIR 100 User Guide," Mobile Industrial Robots A/S, Odense, SØ, Ver. 1.1, (Aug. 2018), 44 pages.
"MIR 100 User Guide," Mobile Industrial Robots A/S, Odense, SØ, Ver. 1.0, (Nov. 2017), 39 pages.
"MiRFleet Reference Guide," Mobile Industrial Robots A/S, Odense, SØ, Ver. 1.0, (Jan. 2017), 32 pages.
File history received for European Patent Application No. 20214616.3, downloaded on Mar. 12, 2025, 282 pages.
Decision to Grant received for European Patent Application No. 20214616.3, mailed on Feb. 6, 2025, 2 pages.
Extended European Search Report received for European Application No. 20214616.3, mailed on May 20, 2021, 8 pages.
Intention to Grant received for European Patent Application No. 20214616.3, mailed on Dec. 20, 2024, 5 pages.
Intention to Grant received for European Patent Application No. 20214616.3, mailed on Nov. 13, 2024, 5 pages.

* cited by examiner

| TIME | AMR ID | AMR LOC | AP ID | CCT |
|------|--------|---------|-------|-----|
| 12:00:01 | 10001 | 1.5, 2 | 33-AF5 | 0.2 |
| 12:00:01 | 10002 | 12, 3 | 4F-HH5 | 0.3 |
| 12:00:01 | 10003 | 5,5 | KK-LLM | 0.2 |
| ... | ... | ... | ... | ... |
| 12:00:02 | 10001 | 1.5, 2.1 | 33-AF5 | 0.2 |
| 12:00:02 | 10002 | 12, 3 | 4F-HH5 | 0.2 |
| ... | ... | ... | ... | ... |

MANAGING A FLEET OF ROBOTS

CROSS-REFERENCE TO RELATED APPLICATIONS

This application is a national stage entry of PCT Application No. PCT/EP2021/080603, which was filed on Nov. 4, 2021. PCT Application No. PCT/EP2021/080603 claims priority to European Patent Application No. 20214616.3 which was filed on Dec. 16, 2020. This application claims priority to PCT Application No. PCT/EP2021/080603 and to European Patent Application No. 20214616.3. The contents of PCT/EP2021/080603 and European Patent Application No. 20214616.3 are incorporated herein by reference.

TECHNICAL FIELD

This specification describes systems and devices for managing a fleet of robots in a facility, for example, including route planning, maintenance scheduling, and facility and management system design.

BACKGROUND

Mobile robots are a robots that is capable of moving in their surroundings. Mobile robots have become more commonplace in a variety of settings. For example, hospitals use autonomous mobile robots to move materials. Warehouses have installed mobile robotic systems to efficiently move materials from stocking shelves to order fulfillment zones. Mobile robots are also used in industrial, military and security settings.

SUMMARY

Methods, systems, and non-transitory machine-readable media encoding instructions for managing a fleet of autonomous mobile robots in a facility are described.

In one aspect, a method is performed by a computer-implemented system and comprises performing a communications cycle, logging, over time, characteristics of the cycle times between the transmission of the test signals and the receipt of the responses to the test signals, analyzing the logged characteristics of the cycle times of the plurality of the autonomous mobile robots to determine i) a location in the facility at which communications between the system and the autonomous mobile robots in the plurality are either inadequate or deficient, or ii) a time of day during which the communications between the system and the autonomous mobile robots in the plurality are either inadequate or deficient, or iii) equipment used to wirelessly transmit the test signals or receive responses thereto in communication cycles where communications between the system and the autonomous mobile robots in the plurality are either inadequate or deficient. The logged characteristics include a location of each of the autonomous mobile robots when responding and a time of day of the communication cycle. Performing the communications cycle includes wirelessly transmitting test signals to a plurality of the autonomous mobile robots in the fleet, and receiving responses to the test signals, wherein the responses are transmitted wirelessly from each of the autonomous mobile robots in the plurality.

This and other aspects can include one or more of the following features. The logged characteristics can include one or more of a) lengths of each of the cycle times, b) identifiers of the autonomous mobile robots in each cycle, or c) identifiers of wireless access points used by the autonomous mobile robots in each cycle. Analyzing the logged characteristics can include identifying that one or more of the logged characteristics is overrepresented in instances where communications between the system and the autonomous mobile robots in the plurality are either inadequate or deficient. Identifying that one or more of the logged characteristics is overrepresented can include identifying that a wireless access point used by the autonomous mobile robots is associated with or responsible for the inadequate or deficient communications. The method can include outputting a notification of the determined inadequate or deficient communications. The notification can include either a time of day during which or the location at which the inadequate or deficient communications occurred. Outputting the notification can include outputting the notification to the autonomous mobile robots in the fleet or modifying a cost in a route planning or work scheduling system. The method can include outputting a representation of logged cycle times. The representation can be a heatmap of cycle times at different locations within the facility during a defined time window. Performing the communications cycle can include instructing a plurality of wireless access points in the facility to transmit the test signals. Analyzing the logged characteristics of the cycle times can include comparing the cycle times to a threshold to determine deviant communication cycle times. Either the location in the facility or the time of day of the inadequate or deficient communications can be determined based on the deviant communication cycle times.

In another aspect, a computer-implemented system for managing a fleet of autonomous mobile robots in a facility can include a log of characteristics of cycle times of communications between the system and the autonomous mobile robots in the fleet over time, and an analysis component configured to determine, based on the logged characteristics of the cycle times, i) a location in a facility at which or ii) a time of day during which or iii) equipment used in communications between the system and the autonomous mobile robots in the plurality that are either inadequate or deficient. Each communications cycle includes wireless transmission of test signals to a plurality of the autonomous mobile robots in the fleet and receipt of responses to the test signals transmitted wirelessly from each of the autonomous mobile robots in the plurality.

This and other aspects can include one or more of the following features. The system can include a communications interface configured to interface with a plurality of wireless access points to wirelessly transmit the test signals and receive the wirelessly from the autonomous mobile robots. The system can include a control component configure to output a notification of the determined inadequate or deficient communications. The notification can include either a time of day during which or the location at which the inadequate or deficient communications occurred. The system can include a control component configure to output a modification of a cost to either a route planning or to a work scheduling system based on the determined location or time of day. The analysis component can be configured to compare the cycle times to a threshold to determine deviant communication cycle times, wherein either the location in the facility or the time of day of the inadequate or deficient communications is determined based on the deviant communication cycle times.

The operations and processes described herein may be performed in a system comprising at least one data processor and a memory communicatively coupled to the at least one processor where the memory stores instructions that when executed cause the at least one processor to perform the operations. Further, a non-transitory computer-readable medium storing instructions which, when executed, cause at least one processor to perform the operations is also contemplated. In other words, while generally described as computer implemented software embodied on tangible, non-transitory media that processes and transforms the respective data, some or all of the aspects may be computer implemented methods or further included in respective systems or other devices for performing this described functionality. The details of these and embodiments of the present disclosure are set forth in the accompanying drawings and the description below. Other features, objects, and advantages of the disclosure will be apparent from the description, drawings, and the claims.

DESCRIPTION OF DRAWINGS

Like reference symbols in the various drawings indicate like elements.

DETAILED DESCRIPTION

Figure 1:
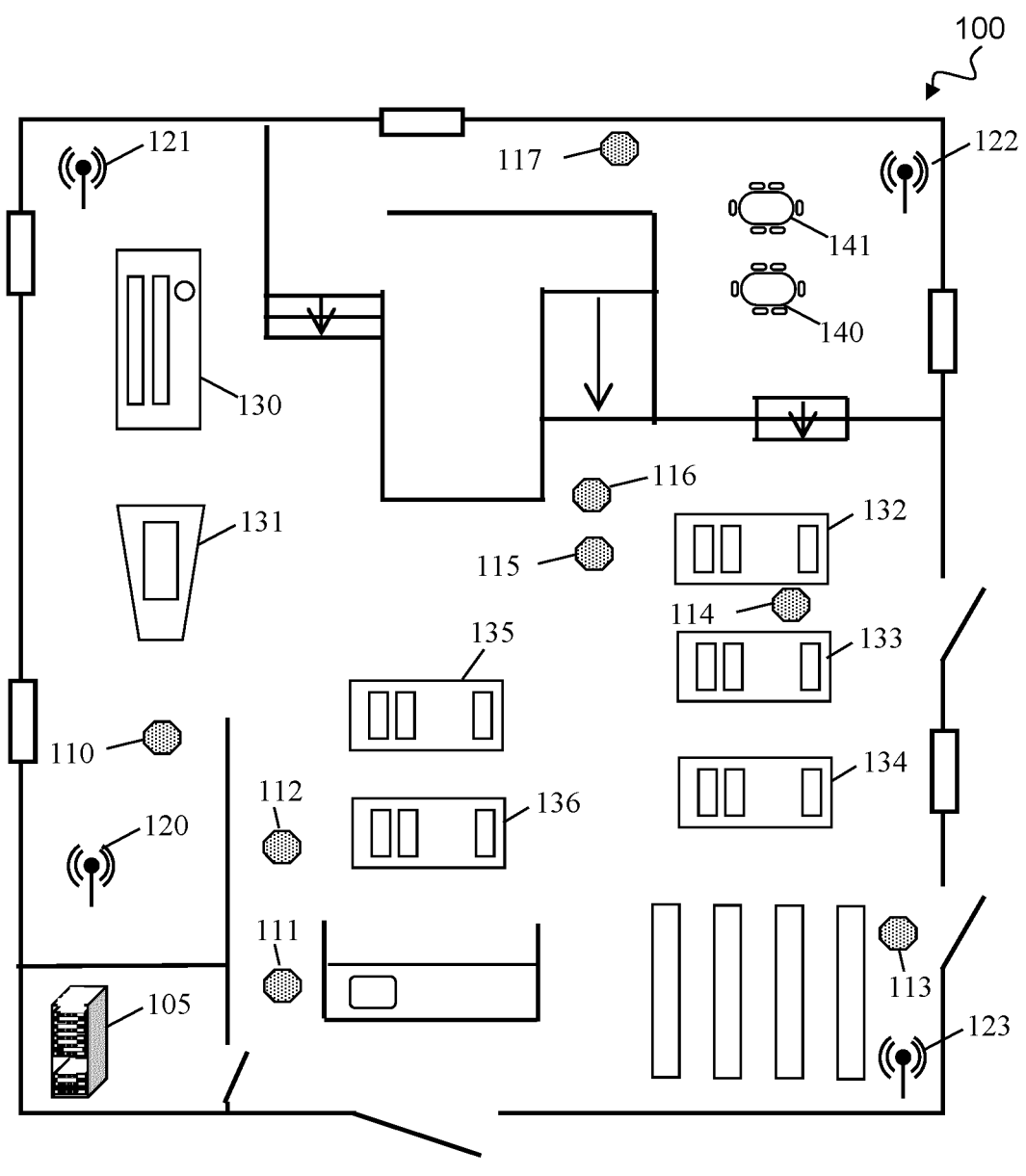
FIG. 1 is a schematic representation of a facility in which autonomous mobile robots are used to perform various operations.

FIG. 1 is a schematic representation of a facility 100 in which autonomous mobile robots are used to perform various operations. Facility 100 includes a fleet management system (i.e., FMS) 105 that manages the operation of a fleet of autonomous mobile robots (i.e., AMRs) 110, 111, 112, 113, 114, 115, 116, 117 within facility 100. While managing the operation of AMRs 110, FMS 105 communicates with AMRs 110, . . . using one or more access points 120, 121, 122, 123 that are distributed across facility 100. Further, FMS 105 collects data that characterizes the effective of information exchange with AMRs 110, . . . . This information can be used, e.g., to improve route planning, maintenance scheduling, and the design and operations of AMRs 110, . . . and FMS 105 within facility 100.

In more detail, facility 100 can be, e.g., a factory, an office, a hospital, or other discrete site. In general, facility 100—along with access points 120, . . . and AMRs 110, . . . —will be under the control of a single operator, e.g., a single corporate or governmental entity. The operator will operate facility 100 for a desired purpose. For example, a factory may produce products, a hospital may provide healthcare, and the like. Facility 100 thus includes equipment and has requirements that are related to this purpose. In the illustrated implementation, facility 100 is shown as including equipment 130, 131, 132, 133, 134, 135, 136 and workspaces 140, 141. Depending on the nature of facility, equipment 130, . . . can be manufacturing equipment, medical equipment, test equipment or the like.

Autonomous mobile robots 110, . . . are mobile machines that can move through facility 100 to perform actions in accordance with programmed instructions. AMRs 110, . . . are autonomous in that they are capable of governing the performance of the programmed instructions independently. In other words, real-time control of operations by an external human or other operator is unnecessary for many work-day actions. These autonomous operations can include defined actions that contribute directly to the operations performed in facility 100 (e.g., manufacturing products, transporting goods and materials, moving carts, cleaning, surveillance, disinfection, etc.) as well as actions that are responsive to unforeseen transient circumstances (e.g., identifying the position of movable obstacles and objects, including other of AMRs 110, responding to alarms or safety conditions, and the like). The instructions are generally stored within AMRs 110, . . . . However, in some implementations, instructions can be stored externally to AMRs 110, . . . and transmitted to AMRs 110, . . . as needed.

AMRs 110, . . . are generally constructed with a body configured to support the weight of an object and wheels that enable the AMR 110, . . . to traverse the surface of facility 100. AMRs 110, . . . are generally programmed to move through facility 100 using an electronic map and sensors. The sensors can be used not only to determine the position of an AMR 110 within facility 100, but also to detect transient circumstances. Example sensors include cameras and scanners (e.g., LIDAR scanning systems).

Route planning and replanning for AMRs 110, . . . is generally an ongoing process with activities being performed both globally by fleet management system 105 and locally by each AMRs 110, . . . For example, in some implementations, fleet management system 105 can specify destinations for each AMR 110, . . . without specifying a particular route, as well as a cost map that is updated on an ongoing basis and that can be used by the AMR 110, . . . to plan a route.

For local route planning, each AMR 110, . . . generally includes a control system that is configured (e.g., programmed) to select or adjust a route along which the AMR 110, . . . is to travel. For example, the control system may have access to a local cost map that contains a representation of one or more possible routes between a first location and a second location in facility 100. The control system may select a route based on the cost of that route. The cost can be recalculated based on transient circumstances, such as a movable obstacle or object being at a location along the route, a door being opened or closed, or the like. Information for adjusting the cost of map may be obtained from detectors located on the AMR 110, . . . itself, detectors located on other AMRs 110, . . . that have traveled or are traveling within a same area, and/or detectors located on other structures such as walls, floors, or ceilings. Thus, some detectors may move whereas others may have fixed positions. In some implementations, fixed-position detectors may, e.g., pivot or translate. Regardless of the particular details of the detectors, the information from the detectors can be conveyed to fleet management system 105 and relayed to AMRs 110, . . . to aid in the selection of efficient routes.

Access points 120, 121, 122, 123 are networking devices that allow AMRs 110, . . . —and in general, other devices— to transmit data to and receive data wirelessly. In general, access points 120, 121, 122, 123 will be part of a single local area network of facility 100 that interconnects FMS 105, AMRs 110, . . . and possibly other devices. Access points 120, 121, 122, 123 are distributed at different positions around facility 100. The positions will in general be chosen to maintain constant communications between AMRs 110, . . . and FMS 105 as AMRs 110, . . . move through facility 100.

Access points 120, . . . can use any of a number of different wireless communication protocols. Examples include IEEE 802.11 xx, IEEE 802.16, IEEE 802.15.4 (including ZigBee), ISA100.11a, Wireless HART, MiWi, SNAP. In some implementations, access points 120, . . . can use communication protocols for mobile devices and data terminals, including those based on the GSM/EDGE and UMTS/HSPA technologies, including 5G.

Fleet management system 105 is a system that manages the operation of AMRs 110, . . . within facility 100. In general, fleet management system 105 is an integrated system that interacts with human operators, AMRs 110, . . . , and even other systems (e.g., user order handling system or an Enterprise Resource Planning (ERP) system) to manage and coordinate those operations. The operations can include, e.g., vehicle tracking, route planning, scheduling. robot replacement and lifecycle management, and the like. In the illustrated implementation, fleet management system 105 is a discrete unit that is on-site at facility 100. In other implementations, fleet management system 105 can be off-site or part of a larger system. For example, fleet management system 105 may be integrated within an ERP system and/or have functionality that is distributed amongst AMRs 110, . . . themselves.

In operation, fleet management system 105 can communicate individually and bidirectionally with each of AMRs 110, . . . via the wireless data transmission system provided by access points 120, . . . . The communicated data can include, e.g., information about the position and operational status of AMRs 110, . . . , operational instructions, safety instructions, routes and route updates, maps and map updates, information about transient circumstances, images of different locations in facility 100, and the like. In general, fleet management system 105 will be configured to address each of AMRs 110, . . . individually, in subgroups, or by broadcast to all AMRs 110, . . . . In some implementations, AMRs 110, . . . may also be able to communicate peer-to-peer, e.g., using either the wireless data transmission system provided by access points 120, . . . or another wireless data transmission mechanism.

If communications between AMRs 110, . . . and fleet management system 105 are not adequate, then the operations of AMRs 110, . . . —and possibly facility 100 itself— can be impaired or even interrupted. Hence, access points 120, . . . will generally be arranged in facility 100 to provide a sufficient signal strength for communications between AMRs 110, . . . and fleet management system 105, regardless of the location of AMRs 110, . . . within facility 100.

Even if the operator of facility 100 is aware of the need to maintain communications between AMRs 110, . . . and fleet management system 105, it is possible that there are times, places, and circumstances where the communication is inefficient or not possible. Signal coverage and strength can vary at different locations and over time. Communications hardware can be defective or overloaded. Communications may be delayed or not occur.

By way of example in the context of the illustrated facility 100, access points 120, . . . may not be exclusively dedicated to communications between AMRs 110, . . . and fleet management system 105. For example, human users at workspaces 140, 141 may also rely upon access point 122 for wireless communications and overload it. As another example, equipment 130, . . . may perform operations that disturbs or interrupts communications between AMRs 110, . . . and fleet management system 105. For example, high voltage equipment 130, . . . may overcome even strong communications signals. Further, these conditions may be transient and occur only when certain conditions arise. For example, an overload may occur only when an unusually high number of human users are at workspaces 140, 141. As another example, high voltage equipment 130, . . . may only be operated intermittently. Indeed, it may require a combination of these or other circumstances for a problem to arise.

As discussed above, AMRs 110, . . . are autonomous and may be able to continue travel or other tasks even without communications with fleet management system 105. Further, AMRs 110, . . . can have built-in controls, e.g., to prevent collisions at intersections or narrow corridors and reroute to navigate and continue operation. If such local rerouting fails, AMRs 110, . . . will generally attempt to communicate with fleet management system 105 to obtain a new route. However, if a communication problem exists, the rerouting might not be possible or efficient. For example, re-routing could be performed at fleet management system 105 with incomplete or aged information.

Figures 2, 3:
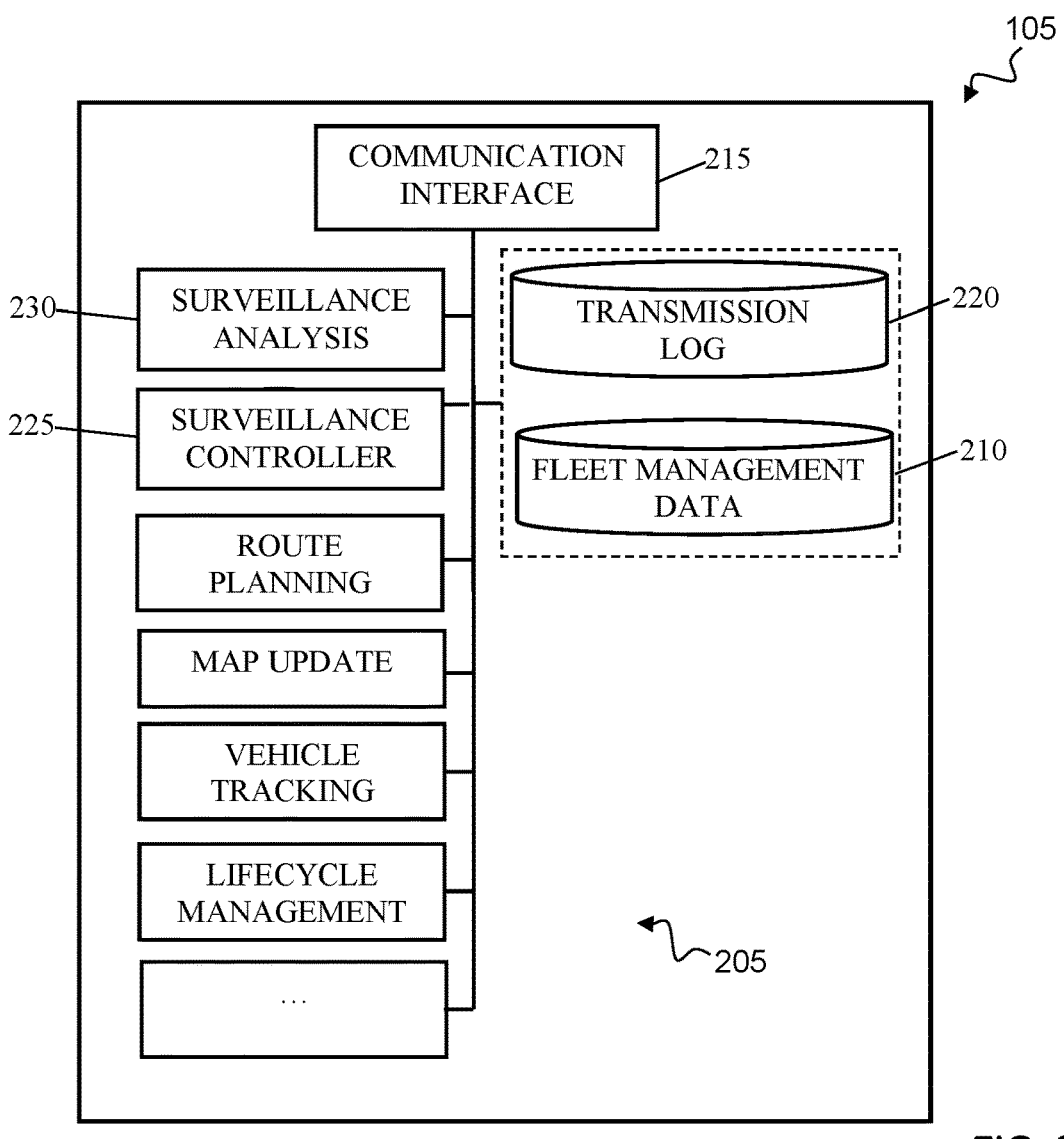
FIG. 2 is a schematic representation of an implementation of fleet management system.
FIG. 3 is a schematic representation of an example transmission log.

FIG. 2 is a schematic representation of an implementation of fleet management system 105. In addition to one or more components 205 for performing operations that manage the operation of a fleet of autonomous mobile robots within a facility and associated fleet management data 210, the illustrated implementation of fleet management system 105 includes a communications interface 215, a transmission log 220, a surveillance controller 225, and a surveillance analysis component 230. Communications interface 215, transmission log 220, surveillance controller 225, and surveillance analysis component 230 interoperate to form a surveillance system that relies upon communication cycle to, e.g., manage a fleet of autonomous mobile robots, diagnose problems arising during management of such a fleet, and take steps to avoid such problems.

Communications interface 215 is a component that is configured to exchange data with devices external to fleet management system 105. For example, communications interface 215 can be a network interface device that is configured to interface fleet management system 205 with, e.g., a local area network with which autonomous mobile robots can interface via one or more wireless access points. Communications interface 215 can be configured to perform various operations to implement a communications interface including, e.g., code conversion, protocol conversion, and buffering.

The communications exchanged with autonomous mobile robots over communications interface 215 can include "pings" or other test signals sent from communications interface 215 and the responses thereto received from autonomous mobile robots. For example, communications interface 215 can operate under instructions from surveillance controller 225 to repeatedly send individually-addressed test signals to each of AMRs 110, . . . The test signal transmissions can repeat at a fixed frequency, e.g., between 0.5 and 5 Hz (i.e., every 2 to 0.2 seconds). Communications interface 215 is also configured to receive a responsive signal from the addressed AMR 210, . . . and report the same to surveillance controller 225.

Surveillance controller 225 is a component that is configured to control the operations of the surveillance system. For example, surveillance controller 225 can be configured to register and de-register autonomous mobile robots from surveillance, ensure that appropriate robots are surveilled at the appropriate times, and log communication cycle information in transmission log 220. In some implementations, surveillance controller 225 is configured to trigger communications interface 215 to automatically send test signals to all AMRs 210, . . . simultaneously, at a fixed frequency, and log the individual response times with a time stamp, location information, an identifier of the responsive AMR, and possibly other parameters.

As discussed further below, surveillance controller 225 can also be configured to take certain remedial actions when communications between AMRs 210, . . . and fleet management system 105 are inadequate or deficient.

Transmission log 220 is a data log of communication cycle information. The data in transmission log 220 is stored in one or more tangible, non-transitory data storage devices. Transmission log 220 can be stored in the same data storage device(s) as other fleet management data 210 or in separate data storage device(s).

FIG. 3 is a schematic representation of an example transmission log 220. The illustrated schematic representation of transmission log 220 is structured as a data table. Each entry in transmission log 220 characterizes a separate communication cycle with a single autonomous mobile robot. In particular, the illustrated schematic representation of transmission log 220 includes a time column 305, an autonomous mobile robot identifier column 310, an autonomous mobile robot location column 315, an access point identifier column 320, and a cycle communication time column 325.

Each entry in time column 305 includes data characterizing when a test signal was sent to an autonomous mobile robot. Each entry in autonomous mobile robot identifier column 310 includes an identifier of an autonomous mobile robot. The identified autonomous mobile robot can either be the robot addressed by an outgoing test signal or the robot that returned a response at the communication cycle time indicated in column 320. Each entry in autonomous mobile robot location column 315 includes an identifier of a location of the autonomous mobile robot during the communication cycle. Each entry in access point identifier column 320 includes identifier of an access point used by the autonomous mobile robot in the communication cycle. Each entry in cycle communication time column 325 includes data characterizing the cycle time for the corresponding communication cycle.

In more detail, communication cycle time or "CCT" is a measurement of the time between the transmission of a test signal and the receipt of a response thereto. In general, the transmission of a test signal is taken to occur when a communications interface of the fleet management system 105 (e.g., communications interface 215, FIG. 2) outputs instructions indicating that a wireless test signal is to be sent to an autonomous mobile robot. The response is taken to be received when the communications interface of the fleet management system 105 receives it. The communication cycle time can thus provide a broad, ongoing measure of the operational conditions in a facility. In other words, communication cycle time is not limited to a single parameter such as, e.g., a one-time measurement of the strength of a wireless signal at a location. Rather, the communication cycle time can reflect the operational conditions of, e.g., a local area network that conveys signals to and from an autonomous mobile robot and the fleet management system, the noise level on the wireless communications channel, and the data load on access points—all as they develop over time and at locations that are distributed through a facility.

As a practical matter, communication cycle time will generally be expected to be less than 1 second. If the communication cycle time rises above 1 second, this implies that an autonomous mobile robot fleet may not to operate as smoothly as intended. For example, status information and instructions may be delayed or even not received.

Although the illustrated implementation of transmission log 220 is a data table, transmission log 220 can be structured in a variety of different ways. For example, a transmission log can include a collection of data records that are each dedicated to communications with an individual autonomous mobile robot or dedicated to communications with different autonomous mobile robots that are located in a particular vicinity. As another example, rather than storing a communication cycle time, the time of transmission and the time of receipt of a response can be stored. As yet another example, a communication cycle time deviation that reflects, e.g., a deviation in communication cycle time from expectations or from a threshold level can be stored. As yet another example, the average communication cycle time over several communication cycles can be logged. As yet another example, in some implementations, a separate column or field need not be maintained for both the location of the autonomous mobile robot location and the access point used by the autonomous mobile robot. Rather, in some implementations, the location of the autonomous mobile robot location can be characterized by the used access point.

Returning to FIG. 2, surveillance analysis component 230 is a component that is configured to analyze surveillance data in transmission log 220 to identify inadequate or deficient communications between AMRs 210, . . . and fleet management system 105. Surveillance analysis component 230 can analyze communication cycle information that has been logged in transmission log 220 to identify inadequacies or deficiencies. Further, surveillance analysis component 230 can analyze communication cycle information to identify characteristics of the communication cycles during which communications were inadequate or deficient. In particular, surveillance analysis component 230 can identify the times of day when communications are inadequate or deficient, the locations where communications are inadequate or deficient, and the equipment (e.g., particular AMRs 210, . . . and/or access points 120, . . . ) responsible for inadequate or deficient communications. In some implementations, these characteristics can be identified by determining whether times of day, locations, and/or equipment certain are more like to have inadequate or deficient communication cycles that other, e.g., times of day, locations, and/or equipment.

For example, in some implementations, the data in transmission log 220 can be processed to select individual entries that characterize inadequate or deficient communication cycles. The frequency of occurrence of the times, the AMR identifiers, the AMR locations, and/or locations in the inadequate or deficient communication cycles can be compared to their frequency of occurrence in a larger data set. The overrepresented characteristic can be identified as associated with or even responsible for the inadequate or deficient communications.

Based on the processing of data in transmission log 220 and a definition of acceptable communication cycle times and/or communication cycle time deviations, surveillance analysis component 230 can determine one or more following example sets of overviews.

1) Deviations in communication cycle time for individual AMRs 210, . . . per time of day and/or date. For example, AMR 210 can be identified as having deviant communication cycle(s) during the minutes 10:15, 10:16 and 10:17, whereas AMR 211 can be identified as having deviant communication cycle(s) during the minutes 11:25, 11:26 and 11:27

2) Deviations in communication cycle time for individual AMRs 210, . . . per location. For example, AMR 210 can be identified as having deviant communication cycle(s) when at a location identified by X:Y coordinates 2.3:24, 2.3:25, and 2.3:26, whereas AMR 211 can be identified as having deviant communication cycle(s) when at a location identified by X:Y coordinates 2.4:24, 2.3:25, and 2.2:26.

3) Deviations in communication cycle time for all AMRs 210, . . . per location. For example, communication cycle time deviations can be plotted on a graphical representation of a route, on a map, or in a table.

4) Deviations in communication cycle time for all AMRs 210, . . . per time of day and/or date. For example, communication cycle time deviations can be plotted in a timetable or graph as a function of time of day and/or date.

In some implementations, surveillance analysis component 230 includes functionality that is configured to attribute an inadequate or deficient communication cycle time to a likely cause. In some implementations, the likely cause is simply a location or a time of day. Data from several AMRs 210, . . . can be combined to identify causes that are independent of the AMRs themselves.

In other implementations, the likely cause is attributed based on additional knowledge regarding the facility in which fleet management system 105 operates. For example, if every AMR 210, . . . repeatedly displays an inadequate or deficient communication cycle time at a particular time of day every day, then surveillance analysis component 230 can attribute the inadequacies or deficiencies to other equipment that may be operational daily during that time of day. As yet example, if every AMR 210, . . . intermittently displays an inadequate or deficient communication cycle time at a particular location that is adjacent to an access point near a workspace, then surveillance analysis component 230 can attribute the inadequacies or deficiencies to transient overload of the bandwidth of that access point.

As discussed above, surveillance controller 225 can be configured to take certain remedial actions when communications between AMRs 210, . . . and fleet management system 105 are inadequate or deficient. For example, in response to surveillance analysis component 230 identifying inadequate or deficient communications, surveillance controller 225 may send a notification a human maintenance operator with information regarding the location and/or timing of the inadequacies or deficiencies. A human maintenance operator may take certain actions (e.g., modifying, exchanging, or repairing hardware, moving/adding access points, modifying operation/communication processes, reducing electromagnetic noise from other machinery or data transmission loads at certain times from other communication equipment units, or the like).

As yet another example, surveillance controller 225 may modify the costs of certain parameters in a route planning or work scheduling system to remedy inadequate or deficient communications. In response, other components in fleet management system 105 can (re)select routes, equipment (different AMRs 210, . . . ) and time slots to avoid or remedy inadequate or deficient communications.

As yet another example, surveillance controller 225 may interact with other components of fleet management system 105 to take remedial action. For example, upon notification of inadequate or deficient communications at particular times of day by surveillance controller 225, fleet management system 105 may (re)schedule activities such as map updates to avoid these times. As yet another example, upon notification of inadequate or deficient communications recurring in a particular of AMRs 210, . . . , fleet management system 105 may schedule maintenance for that AMR.

As yet another example, surveillance controller 225 may interact with other components external to fleet management system 105 to take remedial action. For example, an Enterprise Resource Planning system may be configured to generate work schedules for a facility. Surveillance controller 225 can provide information to such a planning system, which in turn can act to ensure that adequate communications are maintained, e.g., by appropriately (re)scheduling certain activities or ensuring that heavy/important data transmission are scheduled at certain time of day/week, at certain locations, and/or at certain states of operation.

In some implementations, surveillance controller 225 is an adaptive system that is implemented using machine learning techniques designed to reduce communication inadequacies or deficiencies and/or optimize communication cycle time. The data logged in transmission log 220 can be used to train such a system.

Figure 4:
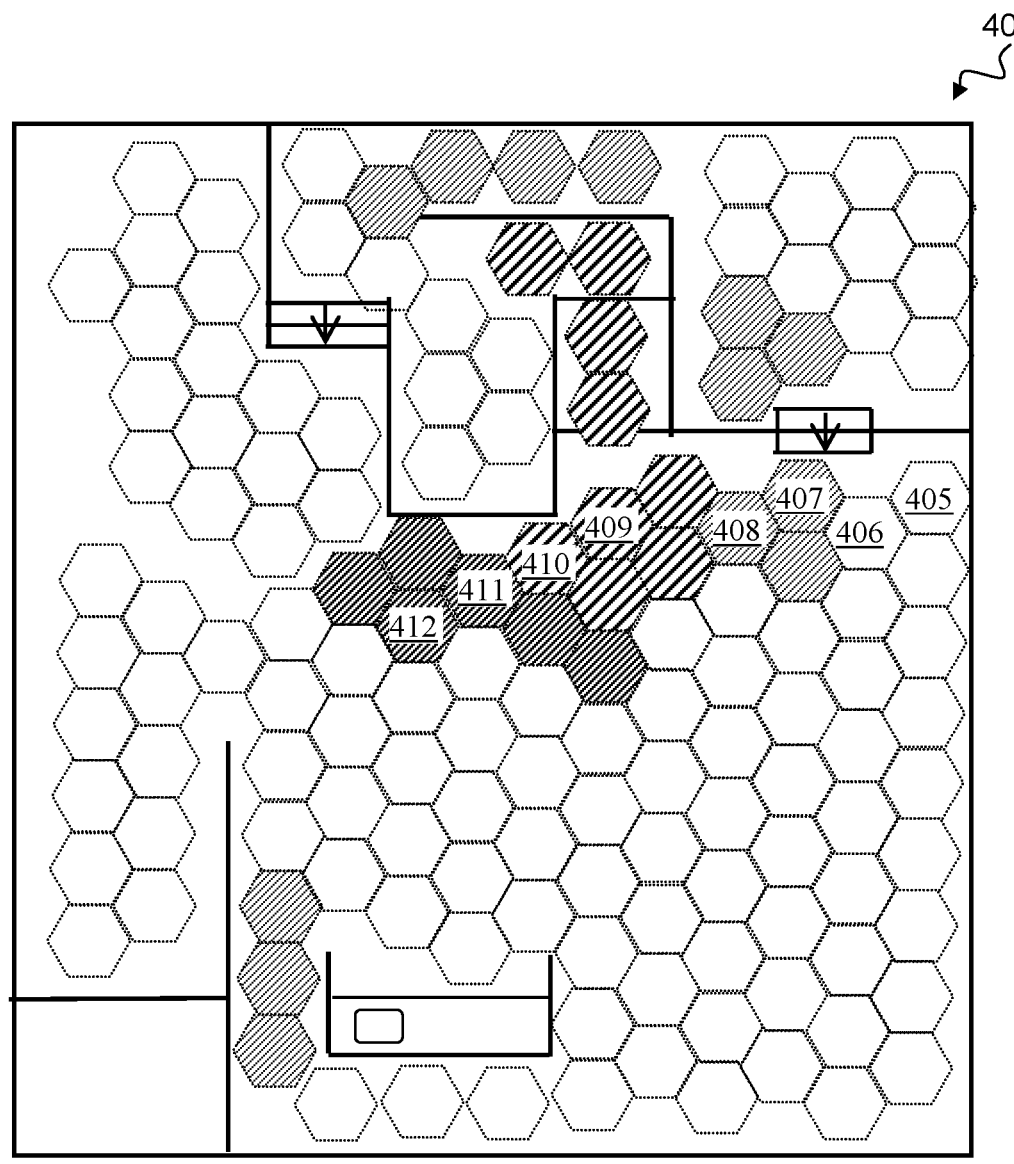
FIG. 4 is a heatmap plot of communication cycle time as a function of physical location.

FIG. 4 is an example of a heatmap of communication cycle time as a function of physical location, namely, a hexbin plot 400. The illustrated implementations of hexbin plot 400 includes a collection of hexagonal bins 405, 406, 407, 408, 409, 410, 411, 412 that each encompass an area within facility 100. Each bin 405, . . . is shaded or colored according to the number of occurrences of inadequate or deficient communications between one or more AMRs 210, . . . and fleet management system 105 with the AMR(s) 210, . . . is positioned within the bin. For example, the shade of hexagonal bins 409, 410 can indicate that adequate or deficient communications occurred more often when an AMR 210, . . . was positioned within those bins than when an AMR 210, . . . was positioned, e.g., within bins 405, 406.

Hexbin plots like hexbin plot 400 can be generated in a number of ways. For example, hexbin plots can be generated for individual AMRs 210, . . . or for an entire fleet. Hexbin plots can be generated to represent communications that occur during a particular time of day (e.g., between noon and 13:00) or a particular day of the week (e.g., every Thursday). Hexbin plots can be generated only when certain equipment is operational (e.g., when a high voltage arc welding device is operational).

In general, a hexbin plot will only show areas where an AMR 210, . . . has been active. Some areas in a facility 100 may not be binned if AMRs 210, . . . are not active there.

Hexbin plot 400 can be generated, e.g., by a surveillance analysis component 230 for presentation to a human user. In general, either a surveillance analysis component 230 or other component will allow a human user to specify one or more a parameters including, e.g., the size of the hexagonal bins, the scale of the shading or coloring, and details regarding the represented data (e.g., the relevant AMRs 210, . . . and the timing of the represented data).

In addition to various hexbin plots, communication cycle time data can be presented to humans in a variety of different ways. For example, other types of heatmaps—including cluster heat maps and spatial heat maps—are possible.

Figure 5:
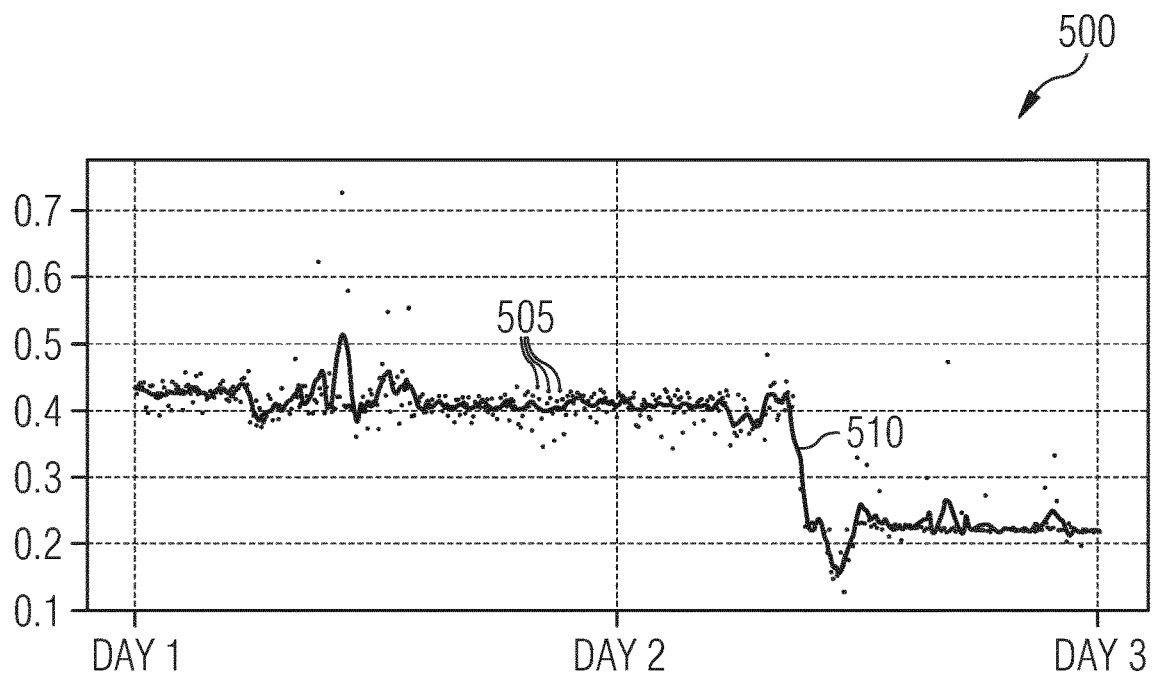
FIG. 5 is a graph of mean communication cycle time per robot in a fleet of robots as a function of time.

As another example, FIG. 5 is a graph 500 of mean communication cycle time per robot in a fleet of robots as a function of time. Position along the x-axis of graph 500 indicates the time of day and/or date when communication cycle time was measured. Position along the y-axis of graph 500 indicates the measured communication cycle time. Graph 500 includes individual data points 505 indicating the mean measured communication cycle time for the fleet as well as a polynomial fitting 510 of data points 505. As shown, communication cycle time dropped dramatically partway through Day 2. Such a decrease in communication cycle time can be attributed to, e.g., the installation of a new access point or a decrease in the communication bandwidth demands of other devices. Further, communication cycle time peaked partway through Day 2. Such an increase in communication cycle time can be attributed, e.g., to the operation of equipment that interferes with wireless data communications.

Figure 6:
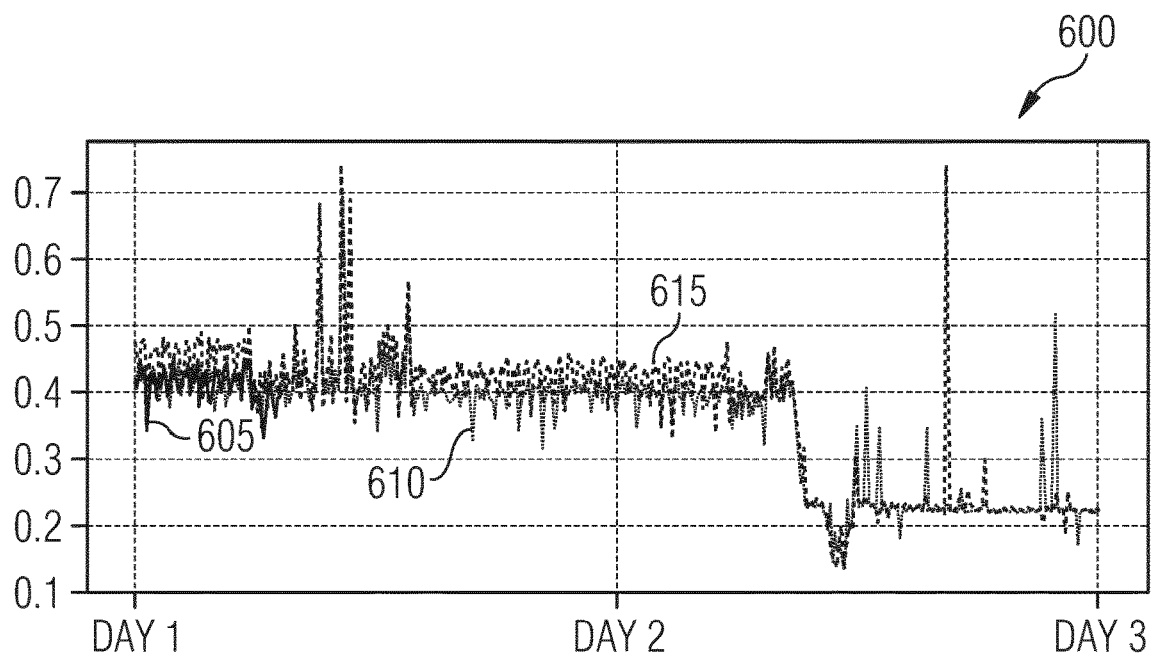
FIG. 6 is a graph of mean communication cycle time for individual robots as a function of time.

As another example, FIG. 6 is a graph 600 of mean communication cycle time for individual robots as a function of time. Position along the x-axis indicates the time of day and/or date when communication cycle time was measured and position along the y-axis indicates the measured communication cycle time. Graph 600 includes a collection of traces 605, 610, 615, . . . , each of which represents the mean communication cycle time for a respective AMR. The data in traces 605, 610, 615, . . . was averaged to arrive at the data points 505 for the fleet (FIG. 5). As shown, even though the fleet-wide drop in communication cycle time partway through Day 2 remain discernable, the individual traces 605, 610, 615, . . . show distinguishable communication cycle times for different robots. Traces 605, 610, 615, . . . can thus be used to identify autonomous mobile robots with worse performance than others and attribute that impaired performance to the location of or access point used by a particular autonomous mobile robot.

Figure 7:
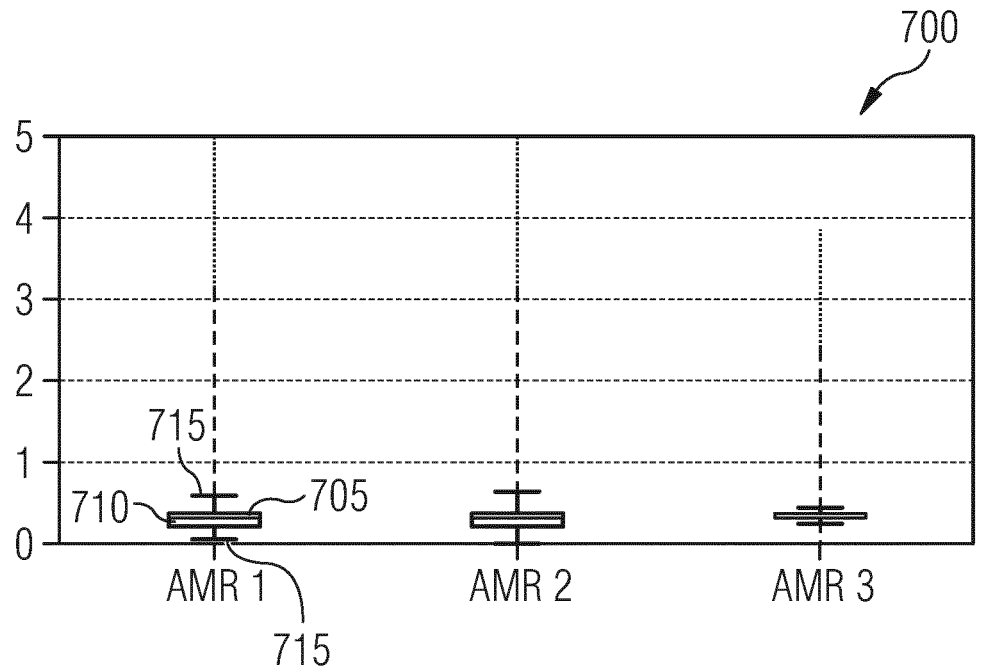
FIG. 7 is a boxplot of the distribution of communication cycle times time for individual autonomous mobile robots during a window of time.

As yet another example, FIG. 7 is a boxplot 700 of the distribution of communication cycle times time for individual autonomous mobile robots during a window of time. Position along the x-axis indicates the autonomous mobile robots and position along the y-axis indicates communication cycle time distribution. In particular, for each autonomous mobile robot, a horizontal line 705 designates the mean communication cycle time of the relevant autonomous mobile robot during the window of time, a box 710 encompassed 50% of the communication cycle times of the relevant autonomous mobile robot during the window of time, and whiskers 715 encompass ~99.3% of the communication cycle times of the relevant autonomous mobile robot during the window of time. Remaining outliers can also be designated.

Fleet management system 105 can be implemented in a computing system. The system can include a processor, a memory, a storage device, and an input/output device. The processor, a memory, a storage device, and an input/output device are interconnected using a system bus. The processor is capable of processing instructions for execution within the fleet management system 105. In some implementations, the processor is a single-threaded processor. In some implementations, the processor is a multi-threaded processor. The processor 810 is capable of processing instructions stored in the memory or on the storage device to display graphical information for a user interface on the input/output device.

The memory stores information within the computing system. In some implementations, the memory is a computer-readable medium. In some implementations, the memory is a volatile memory unit. In some implementations, the memory is a non-volatile memory unit. The storage device is capable of providing mass storage for the computing system. In some implementations, the storage device is a computer-readable medium. In some implementations, the storage device may be a floppy disk device, a hard disk device, an optical disk device, or a tape device. The input/output device provides input/output operations for the computing system. In some implementations, the input/output device includes a keyboard and/or pointing device. In some implementations, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

The invention claimed is:

1. A method for managing a fleet of autonomous mobile robots in a facility, the method being performed by a computer-implemented system, the method comprising:

performing a communications cycle by performing operations comprising:

causing test signals to be transmitted wirelessly to a plurality of the autonomous mobile robots in the fleet; and receiving responses to the test signals, wherein the responses are transmitted wirelessly from each of the autonomous mobile robots in the plurality of autonomous mobile robots;

logging, over time, characteristics of cycle times between transmission of the test signals and receipt of the responses to the test signals, wherein the logged characteristics comprise a location of each of the plurality of autonomous mobile robots when responding to a test signal and a time of day of a corresponding communication cycle; and analyzing the logged characteristics of the cycle times for the plurality of autonomous mobile robots to determine at least one of:

i) a location in the facility at which communications between the computer-implemented system and autonomous mobile robots in the plurality of autonomous mobile robots are either inadequate or deficient; or ii) a time of day during which the communications between the computer-implemented system and autonomous mobile robots in the plurality of autonomous mobile robots are either inadequate or deficient; or iii) equipment used to wirelessly transmit the test signals or to receive responses to the test signals in communication cycles where communications between the computer-implemented system and autonomous mobile robots in the plurality of autonomous mobile robots are either inadequate or deficient; and controlling operation of at least one of the plurality of autonomous mobile robots by causing the at least one of the plurality of autonomous robots to select a route through the facility based at least on the location, the time of day, or the equipment to avoid or to remedy inadequate or deficient communications with the at least one of the plurality of autonomous mobile robots; wherein analyzing the logged characteristics is performed by comparing a frequency of occurrence of at least one of the location or the time of day in the logged characteristics to a frequency of occurrence of the at least one of the location or the time of day in a data set that is larger than the logged characteristics to determine the at least one of the location, or the time of day, or the equipment.

2. The method of claim 1, wherein the logged characteristics comprise one or more of a) lengths of each of the cycle times, b) identifiers of the plurality of autonomous mobile robots in each cycle, or c) identifiers of wireless access points used by the plurality of autonomous mobile robots in each cycle.

3. The method of claim 2, wherein analyzing the logged characteristics comprises identifying that one or more of the logged characteristics is overrepresented in instances where communications between the computer-implemented system and the plurality of autonomous mobile robots are either inadequate or deficient.

4. The method of claim 3, wherein identifying that one or more of the logged characteristics is overrepresented comprises identifying that a wireless access point used by the plurality of autonomous mobile robots is associated with, or responsible for, the inadequate or deficient communications.

5. The method of claim 1, further comprising outputting a notification of the inadequate or deficient communications, wherein the notification comprises either a time of day during which, or the location at which, the inadequate or deficient communications occurred.

6. The method of claim 5, wherein outputting the notification comprises outputting the notification to the autonomous mobile robots in the fleet or modifying a cost in a route planning or work scheduling system.

7. The method of claim 1, further comprising:

outputting a representation of characteristics of logged cycle times.

8. The method of claim 7, wherein the representation comprises a heatmap of cycle times at different locations within the facility during a defined time window.

9. The method of claim 1, wherein causing the test signals to be transmitted comprises instructing a plurality of wireless access points in the facility to transmit the test signals.

10. The method of claim 1, wherein analyzing the logged characteristics of the cycle times comprises comparing cycle times to a threshold to determine deviant communication cycle times.

11. The method of claim 10, further comprising determining either the location in the facility or the time of day of the inadequate or deficient communications based on the deviant communication cycle times.

12. A computer-implemented system for managing a fleet of autonomous mobile robots in a facility, the computer-implemented system comprising:

memory storing a log of characteristics of communication cycle times of communications between the computer-implemented system and a plurality of the autonomous mobile robots in the fleet over time, wherein each communications cycle comprises the computer-implemented system causing wireless transmission of test signals to the plurality of autonomous mobile robots and receipt of responses to the test signals transmitted wirelessly from each of the autonomous mobile robots in the plurality of autonomous mobile robots; and one or more processing devices configured to determine, based on the log of characteristics of the cycle times, at least one of:

i) a location in the facility at which communications between the computer-implemented system and the autonomous mobile robots in the plurality of autonomous mobile robots are either inadequate or deficient; or ii) a time of day during which communications between the computer-implemented system and the autonomous mobile robots in the plurality of autonomous mobile robots are either inadequate or deficient; or iii) equipment used in communications, which are either inadequate or deficient, between the computer-implemented system and the autonomous mobile robots in the plurality of autonomous mobile robots; and wherein the one or more processing devices are also configured to control operation of at least one of the plurality of autonomous mobile robots by causing the at least one of the plurality of autonomous robots to select a route through the facility based at least on the location, the time of day, or the equipment to avoid or to remedy inadequate or deficient communication with the at least one of the plurality of autonomous mobile robots;

wherein the one or more processing devices are configured to compare a frequency of occurrence of at least one of the location or the time of day in the log of characteristics to a frequency of occurrence of the at least one of the location or the time of day in a data set that is larger than the log of characteristics to determine the at least one of the location, the time of day, or the equipment.

13. The computer-implemented system of claim 12, further comprising:

a communications interface configured to interface with a plurality of wireless access points to wirelessly transmit the test signals and to transmit the responses from the autonomous mobile robots in the plurality of autonomous mobile robots.

14. The computer-implemented system of claim 12, wherein the one or more processing devices are configured to output a notification of the inadequate or deficient communications, wherein the notification comprises either a time of day during which, or the location at which, the inadequate or deficient communications occurred.

15. The computer-implemented system of claim 12, wherein the one or more processing devices are configured to output a modification of a cost to either a route planning or a work scheduling system based on the location or time of day.

16. The computer-implemented system of claim 12, wherein the one or more processing devices are configured to compare the cycle times to a threshold to determine deviant communication cycle times, wherein either the location in the facility or the time of day of the inadequate or deficient communications is determined based on the deviant communication cycle times.

17. The computer-implemented system of claim 12, wherein the computer-implemented system causes the wireless transmission of test signals by instructing one or more wireless access points to transmit the test signals.

18. The computer-implemented system of claim 12, wherein the one or more processing devices are configured to output a representation of characteristics of logged cycle times.

19. The computer-implemented system of claim 18, wherein the representation comprises a heatmap of cycle times at different locations within the facility during a defined time window.

20. The computer-implemented system of claim 12, wherein the computer-implemented system causes the wireless transmission of test signals by outputting the test signals.

21. A system for managing a fleet of autonomous mobile robots in a facility, the system comprising:

means for storing a log of characteristics of communication cycle times of communications between the system and a plurality of the autonomous mobile robots in the fleet over time, wherein each communications cycle comprises the system causing wireless transmission of test signals to the plurality of autonomous mobile robots and receipt of responses to the test signals transmitted wirelessly from each of the autonomous mobile robots in the plurality of autonomous mobile robots; and means for determining, based on the log of characteristics of the cycle times, at least one of i) a location in a facility at which communications between the system and the autonomous mobile robots in the plurality of autonomous mobile robots are either inadequate or deficient; or ii) a time of day during which communications between the system and the autonomous mobile robots in the plurality of autonomous mobile robots are either inadequate or deficient; or iii) equipment used in communications, which are either inadequate or deficient, between the system and the autonomous mobile robots in the plurality of autonomous mobile robots; and means for controlling operation of at least one of the plurality of autonomous mobile robots by causing the at least one of the plurality of autonomous robots to select a route through the facility based at least on the location, the time of day, or the equipment to avoid or to remedy inadequate or deficient communication with the at least one of the plurality of autonomous mobile robots;

wherein the means for determining is configured to compare a frequency of occurrence of at least one of the location or the time of day in the log of characteristics to a frequency of occurrence of the at least one of the location or the time of day in a data set that is larger than the log of characteristics to determine the at least one of the location, the time of day, or the equipment.

* * * * *